(12) United States Patent
Holtmann et al.

(10) Patent No.: US 10,253,839 B2
(45) Date of Patent: Apr. 9, 2019

(54) DAMPING VALVE FOR A VIBRATION DAMPER

(71) Applicant: ZF FRIEDRICHSHAFEN AG, Friedrichshafen (DE)

(72) Inventors: Guido Holtmann, Windeck (DE); Achim Eich, Lohmar (DE); Jürgen Henrichs, Hamm (DE); Jörg Rösseler, Ruppichteroth (DE); Aleksander Knezevic, Eitorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 36 days.

(21) Appl. No.: 15/525,150

(22) PCT Filed: Oct. 12, 2015

(86) PCT No.: PCT/EP2015/073502
§ 371 (c)(1),
(2) Date: May 8, 2017

(87) PCT Pub. No.: WO2016/074870
PCT Pub. Date: May 19, 2016

(65) Prior Publication Data
US 2017/0335919 A1  Nov. 23, 2017

(30) Foreign Application Priority Data
Nov. 12, 2014  (DE) .................. 10 2014 223 086

(51) Int. Cl.
F16F 9/348  (2006.01)
F16K 47/10  (2006.01)

(52) U.S. Cl.
CPC .............. *F16F 9/348* (2013.01); *F16K 47/10* (2013.01)

(58) Field of Classification Search
USPC ......... 251/54; 137/854, 493.8, 493.9, 516.29
See application file for complete search history.

(56) References Cited

U.S. PATENT DOCUMENTS 3,003,596 A * 10/1961 Bourcier De Carbon ................... F16F 9/3405 137/493
4,899,855 A * 2/1990 de Carbon .............. F16F 9/348 137/493.8
2005/0067238 A1  3/2005 Deferme et al.
(Continued)

FOREIGN PATENT DOCUMENTS

DE  21 09 398 C3  9/1972
DE  100 35 640  5/2001
(Continued)

*Primary Examiner* — Marina A Tietjen
*Assistant Examiner* — Daphne M Barry
(74) *Attorney, Agent, or Firm* — Cozen O'Connor

(57) ABSTRACT

Damping valve having a damping valve body with at least one passage channel between two cover sides. An outlet opening of the passage channel leads into a cover-side annular channel which is limited by an outer annular valve support surface and by an inner annular valve support surface, the at least one annular valve support surface for at least one valve disk has a substantially constant width along the circumference, and the annular channel has a varying width along the circumference, and at least one valve support surface has a varying radius of curvature along the circumference.

8 Claims, 2 Drawing Sheets

(56) References Cited

U.S. PATENT DOCUMENTS

2007/0034466 A1* 2/2007 Paesmans .............. B60G 17/08
188/322.22
2013/0020159 A1* 1/2013 Groves ................ F16F 9/3484
188/313

FOREIGN PATENT DOCUMENTS

| DE | 10 2010 040 458 | 3/2012 |
| DE | 10 2010 060 792 | 5/2012 |
| DE | 11 2012 003 051 | 4/2014 |
| DE | 10 2013 224 253 | 6/2014 |
| JP | 2 958 333 | 7/1991 |

* cited by examiner

DAMPING VALVE FOR A VIBRATION DAMPER

CROSS REFERENCE TO RELATED APPLICATIONS

This is a U.S. national stage of application No. PCT/EP2015/073502, filed on Oct. 12, 2015. Priority is claimed on German Application No. DE102014223086.1, filed Nov. 12, 2014, the content of which is incorporated here by reference.

BACKGROUND OF THE INVENTION

1. Field of the Invention

The invention is directed to a damping valve for a vibration damper.

2. Description of the Prior Art

DE 21 09 398 C3 describes a damping valve for a vibration damper. The damping valve comprises a damping valve body with a cover side having an eccentric, circular ring-shaped valve support surface. Constructed at a radial distance is an inner circular ring-shaped valve support surface that is oriented eccentrically in the same orientation. This results in an eccentric annular channel with a constant radial width. A centric valve disk covering the annular channel accordingly has a pressure area radius which varies along the circumference. A defined lift-off behavior of the valve disk from the outer valve support surface is achieved in this way.

The construction according to DE 21 09 398 C3 has the functional disadvantage that the shape of the inhomogeneous width of the outer valve support surface leads to a sticking effect that has a persistent negative influence on the opening behavior.

JP2958333 B2 describes a construction in which two valve support surfaces are constructed eccentric to one another that define an annular channel. The valve support surfaces have a substantially constant radial width. In a valve construction of this type, a valve disk with a constant outer diameter has a different radial overlap relative to the valve support surface along the circumference. This results in an unfavorable pressure application point in lift-off direction on the valve disk.

SUMMARY OF THE INVENTION

It is an object of the present invention to minimize the disadvantage of the sticking effect known from the prior art.

This object is met in that at least one valve support surface has a varying radius of curvature along the circumference.

The varying radius of curvature results in an asymmetrical annular channel and, therefore, an asymmetrical pressure-impinged surface at the valve disk.

One advantage is that it is possible to maintain a constant width of the valve support surface in spite of the asymmetrical shape of the annular channel. As a result of the varying radii of curvature, the available surface area of a cover side of the valve body can be utilized appreciably better, i.e., a larger annular channel is possible than with a circular geometry.

In one embodiment, the outer valve support surface has the varying radius of curvature. The centroid of the annular channel tends to shift very noticeably radially outward so that a correspondingly larger lever is available for the pressing force acting on the valve disk.

Alternatively, the inner valve support surface can have the varying radius of curvature.

Tests have shown that it is advantageous if the radius of curvature has a minimum and a maximum, and the two extreme values have a distance of less than 180° along the circumference of the valve support surface. The egg shape follows this definition, for example. The advantage consists in that the surface area of a cover side can be utilized in an optimal manner in a damping valve body with a constant outer diameter.

The annular channel has at least one supporting segment for a valve disk in order to minimize a deformation of the valve disk with a rear incident flow.

To achieve the most uniform possible support, the at least one supporting element has an arc shape.

In order to achieve the best possible incident flow of the valve disk, the distance of the supporting segment from the inner valve support surface is less than the distance from the outer valve support surface in the region of the greatest width of the annular channel.

So as not to have to suffer any losses with respect to the magnitude of the pressure-impinged surface at the valve disk through the use of the at least one supporting segment, the supporting segment has a smaller height proceeding from the annular channel than the valve support surface. With respect to the height dimensioning, the outer valve support surface and the inner valve support surface are connected along a radial height line. The supporting segment then has a slight distance from the height line. When there is a height offset between the outer valve support surface and the inner valve support surface, it may happen that the supporting segment is slightly higher than one of the two valve support surfaces.

For purposes of a simple basic construction of the damping valve, the at least one valve disk has a constant outer diameter. This does away with an installed position oriented in circumferential direction.

BRIEF DESCRIPTION OF THE DRAWINGS

The invention will be described more fully referring to the following description of the drawings.

In the drawings.

DETAILED DESCRIPTION OF THE PRESENTLY PREFERRED EMBODIMENTS

Figure 1:
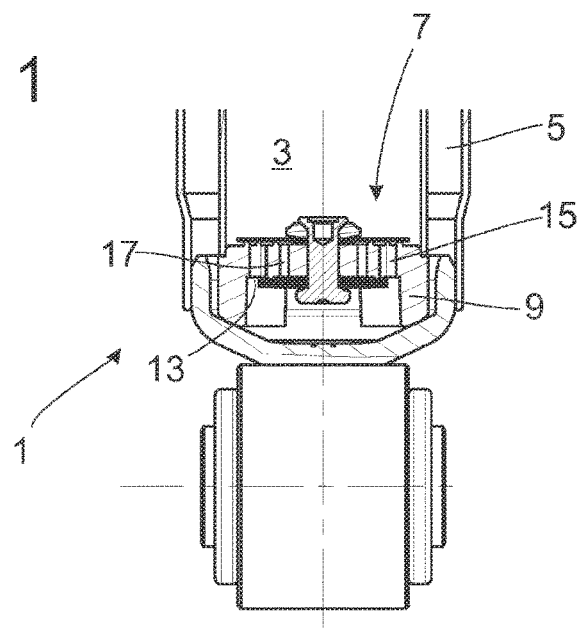
FIG. 1 is an installation situation of a damping valve.

FIG. 1 shows, by way of example, a section from a vibration damper 1 constructed as a two-tube damper that has a damping valve 7 between a working chamber 3 filled with damping medium and a compensation space 5. In principle, the damping valve 7 can also be used for a piston rod or as pre-valve for an adjustable damping valve. The possible applications are not limited to the graphic representation or the above-mentioned cases.

Figure 2:
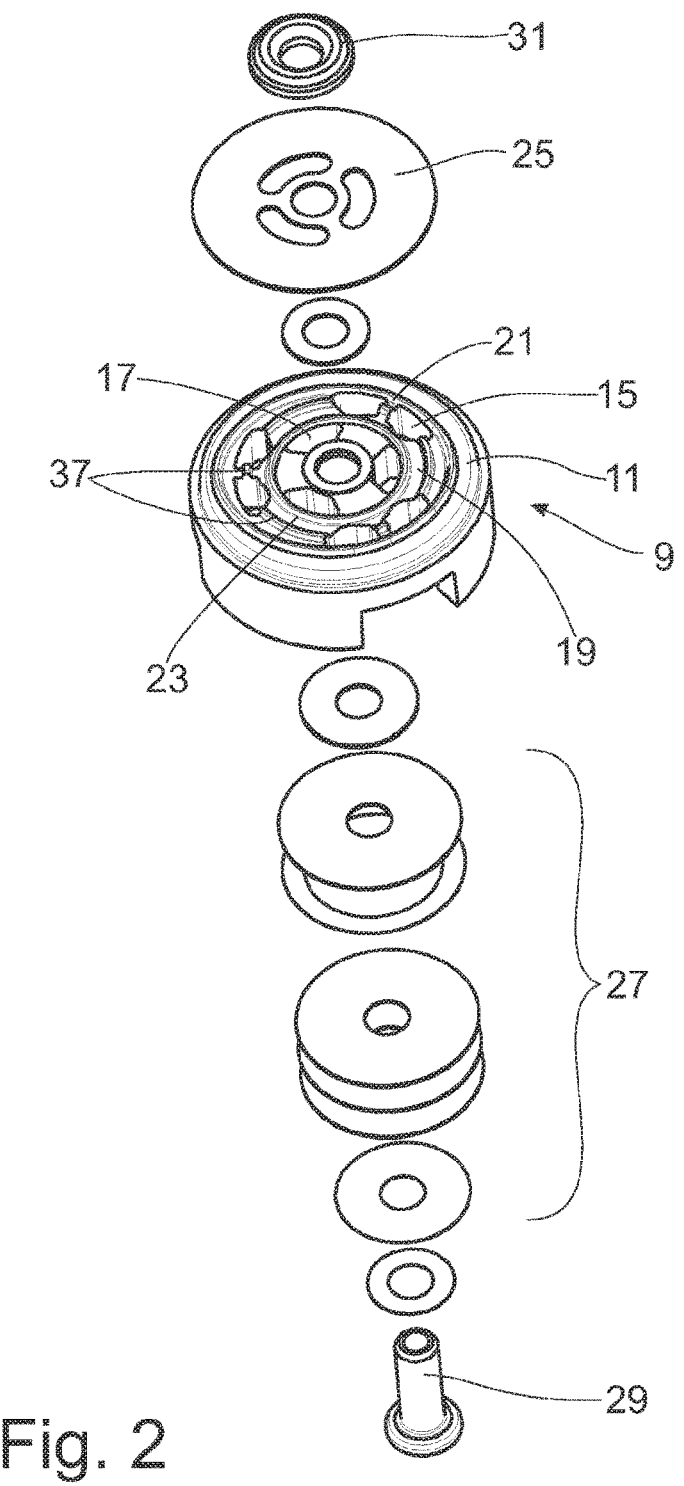
FIG. 2 is an exploded view of the damping valve.

As can be seen more clearly when viewed in conjunction with FIG. 2, the damping valve 7 has a damping valve body 9 having two cover sides 11, 13. At least one passage channel 15, 17 connects the two cover sides 11, 13. In the present embodiment example, passage channels 15 are available for a first flow direction proceeding from the compensation space into the working chamber 3 and passage channels 17 are available for a flow proceeding from working chamber 3 into the compensation space 5. The quantity, shape and size of the passage channels are dependent, inter alia, on the diameter of the damping valve body 9. Simple circle cross sections or combinations of groove shapes and circle shapes can also be selected instead of the groove-shaped cross sections of the passage channels.

Outlet openings of the passage channels 15 lead into an annular channel 19 limited by an outer valve support surface 21 and inner valve support surface 23. At least one valve disk 25 is seated on this valve support surface. The outlet openings of the passage channels 17 are also covered by valve disks 27. The entire assembly of valve disks 25, 27 and damping valve body 9 is held together under a defined preloading by a bolt 29 with a locking ring 21. The outfitting of the damping valve body with valve disks depends on a targeted damping force characteristic so that this representation is likewise meant to be exemplary.

Figure 3:
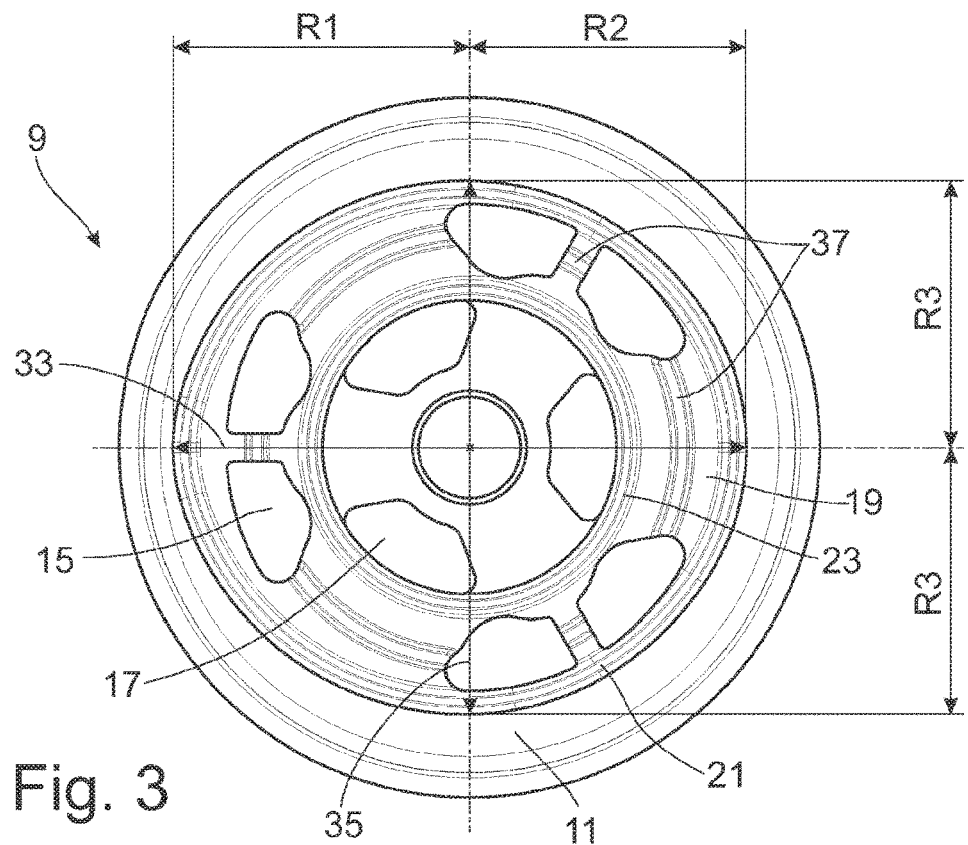
FIG. 3 is a top view of the damping valve body according to FIG. 2.

FIG. 3 shows the damping valve body 9 in a top view. As will now be seen more clearly, the passage channels 15, 17 are arranged on a common pitch circle for one flow direction in each instance. This arrangement is not compulsory. Within the scope of manufacturing tolerances, the valve support surfaces 21, 23 have a constant width. Consequently, viewed along the circumference of the valve support surfaces, the adhesive forces between the valve disk 25 and the valve support surfaces 21, 23 are substantially constant.

It can be seen clearly that the annular channel 19 has a varying width considered along the circumference and is accordingly formed asymmetrically with reference to the center point of the damping valve body 9, since at least one valve support surface 21, 23 has a varying radius of curvature along the circumference. In this graphic depiction, the outer valve support surface 21 has the varying radius of curvature along the circumference. In principle, the inner valve support surface could also have the varying radius of curvature. A combination of both valve support surface shapes would also be conceivable and meaningful.

In the example according to FIG. 3, the radius of curvature of the outer valve support surface has a maximum and a minimum. The distance between the two extreme values amounts to less than 180°. The outer valve support surface 21 is formed symmetrically with reference to a main axis 33. Proceeding from a center point of the valve body, the length of the main axis 33 for the valve support surface is R1+R2. R1 is greater than R2. The length of the normals 35 to the main axis 33 is two times R3 and is shorter than the main axis 33. The outer valve support surface has no radial offsets, resulting in an egg-shaped geometry of the valve support surface. The geometry can be constructed by drawing an arc with radius R1/2 around the center point and an arc with radius R1/2 opposite the latter. These two arcs are connected to one another tangentially via a connecting arc having a distance from the center point of 2×R3.

This geometry of the valve support surface 21 is meant only as an example of an asymmetrical shaping. A pentagon, for example, could also be used as foundation and the distances of the corner points from the center point could be configured differently and connected to one another as corner points along an arc contour.

During an incident flow proceeding from working chamber 3, the valve disk 25 is exposed to a bending load. In order to limit the bending of the valve disk 25 particularly in the area of the greatest width of the annular channel 19, the damping valve body 9 has at least one supporting segment 37 for the valve disk 25 in the annular channel 19. The at least one supporting segment 37 preferably has an arc shape. The distance of the supporting segment 33 from the center point of the damping valve body 9 is constant within the scope of manufacturing tolerance, i.e., the distance of the supporting segment 37 from the inner valve support surface 23 is less than the distance from the outer valve support surface 21 in the area of the greatest width of the annular channel 17. Accordingly, the supporting segment 37 divides the annular channel 17 into two circumferential regions of different width, wherein the region with the greatest width extends radially outside of the supporting segment 37. The supporting segments 37 are separated by the outlet openings of the passage channels 15.

Basically, the supporting segments 37 do not form any valve support surface comparable with the inner valve support surface 21 or outer valve support surface 23, since the front side of the supporting segments 37, proceeding from annular channel 17, has a smaller height than valve support surfaces 21, 23. Therefore, during an incident flow of the valve disk 25 proceeding from annular channel 17, there remains a smaller gap into which the damping medium can enter, and accordingly the entire region between the inner valve support surface 21 and the outer valve support surface 23 is available as pressure-impinged surface at the valve disk 25.

The valve disk 25 used has a constant outer diameter. As a result of the comparatively small dimensional difference between R1, R2 and R3, the valve disk projects radially only slightly over the outer valve support surface 21, particularly in region R1.

During an incident flow of the damping valve 7 proceeding from the compensation space 5, a pressure application point in the area of R1 lies slightly farther radially outside than along the further circumferential area of the annular channel. Therefore, the lever arm operative on the valve disk 25 is also the largest at the above-mentioned location corresponding to the distance from the center point of the valve disk 25. Consequently, the valve disk lifts in a defined manner in the area of R1 first and then progressively on both sides without discontinuities of force.

The invention claimed is:

1. A damping valve comprising:
   two cover sides;
   a damping valve body with at least one passage channel between the two cover sides;
   an outer annular valve support surface;
   an inner annular valve support surface; and
   an outlet opening of the at least one passage channel that leads into a cover-side annular channel limited by the outer annular valve support surface and the inner annular valve support surface,
   wherein at least one of the outer annular valve support surface and the inner annular valve support surface for at least one valve disk has a substantially constant width along a circumference,
   wherein the annular channel has a varying width along the circumference, and
   wherein the outer annular valve support surface and has a varying radius of curvature along the circumference.

2. The damping valve according to claim 1, wherein the inner annular valve support surface has the varying radius of curvature.

3. The damping valve according to claim 1, wherein the varying radius of curvature has two extreme values, a minimum R3 and a maximum R1, wherein the two extreme values have a distance of less than 180° along the circumference of at least one of the outer annular valve support surface and the inner annular valve support surface.

4. The damping valve according to claim 1, wherein the annular channel has at least one supporting segment for the at least one valve disk.

5. The damping valve according to claim 4, wherein the at least one supporting element has an arc shape.

6. The damping valve according to claim 4, wherein a distance of the at least one supporting segment from the inner annular valve support surface is less than the distance from the outer annular valve support surface in a region of a greatest width of the annular channel.

7. The damping valve according to claim 4, wherein the at least one supporting segment has a smaller height proceeding from the annular channel than at least one of the outer annular valve support surface and the inner annular valve support surface.

8. The damping valve according to claim 1, wherein the at least one valve disk has a constant outer diameter.

* * * * *